(12) United States Patent
Navarro

(10) Patent No.: US 8,296,402 B2
(45) Date of Patent: Oct. 23, 2012

(54) DETERMINING AND DOWNLOADING PORTIONS OF A SOFTWARE APPLICATION IN A COMPUTER SYSTEM

(75) Inventor: Luis A. Navarro, Austin, TX (US)

(73) Assignee: National Instruments Corporation, Austin, TX (US)

( * ) Notice: Subject to any disclaimer, the term of this patent is extended or adjusted under 35 U.S.C. 154(b) by 685 days.

(21) Appl. No.: 12/419,809

(22) Filed: Apr. 7, 2009

(65) Prior Publication Data
US 2010/0257520 A1    Oct. 7, 2010

(51) Int. Cl.
G06F 15/177 (2006.01)
G06F 15/16 (2006.01)
(52) U.S. Cl. .................................. 709/220; 709/219
(58) Field of Classification Search ........... 709/219–220
See application file for complete search history.

(56) References Cited

U.S. PATENT DOCUMENTS

| | | | |
|---|---|---|---|
| 6,408,434 B1 | 6/2002 | Fujiwara | |
| 7,890,430 B2 * | 2/2011 | Lopatic | 717/168 |
| 2003/0195951 A1 | 10/2003 | Wittel et al. | |
| 2005/0102665 A1 | 5/2005 | Barta et al. | |
| 2005/0102667 A1 | 5/2005 | Barta et al. | |
| 2006/0010438 A1 * | 1/2006 | Brady et al. | 717/174 |
| 2006/0031537 A1 | 2/2006 | Boutboul et al. | |
| 2006/0140658 A1 | 6/2006 | Shimizu | |
| 2006/0271926 A1 * | 11/2006 | Hutton et al. | 717/168 |
| 2007/0006222 A1 | 1/2007 | Maier et al. | |

* cited by examiner

*Primary Examiner* — Minh-Chau Nguyen
(74) *Attorney, Agent, or Firm* — Meyertons Hood Kivlin Kowert & Goetzel, P.C.; Jeffrey C. Hood

(57) ABSTRACT

Determining and downloading portions of a software application in a computer system. The software application may include a plurality of portions. Which of those plurality of portions are currently present on the computer system and which of those plurality of portions are not currently present on the computer system may be determined. The portions of the software application which are not currently present on the computer system may be downloaded to the computer system. The portions of the software application which are currently present on the computer system may not be downloaded to the computer system.

20 Claims, 7 Drawing Sheets

DETERMINING AND DOWNLOADING PORTIONS OF A SOFTWARE APPLICATION IN A COMPUTER SYSTEM

FIELD OF THE INVENTION

The present invention relates generally to computer systems and more particularly to a system and method for determining and downloading portions of a software application.

DESCRIPTION OF THE RELEVANT ART

Installers are applications used to install, repair, and remove programs on computer systems. For example, in the Windows Operating System, the Windows Installer technology is commonly used. The installer comprises installation packages commonly known as "MSIs" which contain all the necessary information to install and uninstall applications. There are also other software technologies available not based on the MSI technology which are also used to install files.

The current paradigm used for installation packages is to use a monolithic package that includes all the files desired to be installed. This paradigm works well for small applications, but it proves to be very slow and inefficient for large ones, since every file must be executed sequentially within the same process.

Some companies with large applications have opted to partition their monolithic installation packages into smaller parts and create an infrastructure that can launch them one at a time. This infrastructure however cannot launch the smaller parts in parallel, mainly due to the inability of the available technologies to execute installer packages in parallel.

Many companies also provide installers for their products through their websites. The process normally follows the sequential pattern of first downloading an installation package from the internet and then running it to install the application. Prior art systems need to wait for the installation package(s) to be available in the system before running the installation package to install the application.

Software applications sometimes contain components that are also included in other applications. However, in prior art systems, even if a customer already has installed one or more components of a software application, the customer would still have to download the entire installation package(s) for that application, potentially including portions of the application which are already present on the customer's computer system.

As expected, the overall process of downloading and installing files takes longer as the application grows in size (e.g. as more files are added), regardless of whether a monolithic package approach is taken or a collection of installation packages is used. Reducing the overall time required to download and install applications would represent a significant improvement over the current paradigm. Therefore, improvements in the field are desired.

SUMMARY OF THE INVENTION

Various embodiments are presented of a system and method for determining and downloading portions of a software application onto a computer system. The method may be computer implemented, e.g., the steps of the method may be performed programmatically by one or more computer programs in various embodiments. The computer system may be a client computer system, and may be coupled (e.g., over a network) to a server computer. The server computer may store the software application for remote download, e.g., by the client computer system. The software application may include multiple (e.g., a plurality of) portions, one or more of which may already be present on the client computer system, in some embodiments.

The method may include determining which of the plurality of portions are currently present on the client computer system. The method may also include determining which of the plurality of portions are not currently present on the client computer system.

In some embodiments, the method may also include determining, of the portions that are currently present on the computer system, which portions are currently installed on the computer system. In other words, in some embodiments, one or more of the portions of the software application may be present and fully installed in the computer system, and/or one or more of the portions of the software application may be present in the computer system but not installed; the method may therefore determine which of the portions that are present on the computer system are fully installed and which of the portions that are present on the computer system are not installed.

The method may include downloading (e.g., from the server computer) any portions of the software application which are not currently present on the client computer system. In some embodiments, only the portions of the software application which are not present on the client computer system may be downloaded; that is, any portions determined to already be present on the client computer system may not be downloaded to the computer system.

In some embodiments downloading the portions not present on the client computer system may be performed by a downloader process, e.g., as part of a downloader application. In some embodiments (e.g., if there are multiple portions determined to not be present on the client computer system), each portion to be downloaded may be downloaded by a respective downloader process; in other words, there may be a separate downloader process for each portion to be downloaded. Some embodiments may include two or more downloader processes executing concurrently, or simultaneously. For example, a first downloader process may execute on a first processor of the client computer system to download a first portion to be downloaded of the software application. A second downloader process may also execute on the first processor to download a second portion to be downloaded of the software application. Thus, the first downloader process and the second downloader process may execute concurrently on the first processor. Alternatively, the second downloader process may execute on a second processor of the client computer system (e.g., if the computer is a multi-processor computer system) simultaneously with the first downloader process executing on the first processor of the client computer system. Alternatively, each portion of the software application may be downloaded sequentially, either each by a respective downloader process, or all by a single downloader process, as desired.

In some embodiments, the method may further include installing any portions present but not installed on the computer system. For example, the portions (if any) determined to be present on the client computer system but not installed may be installed by an installer process, e.g., of an installer application. It should be noted that in some embodiments the installer application may be the same application as the downloader application, however, they may also be different applications.

In some embodiments, (e.g., if there are multiple portions to be installed), each portion to be installed may be installed by a respective installer process; in other words, there may be a separate installer process for each portion to be installed. Some embodiments may include two or more installer processes executing concurrently, or simultaneously. For example, a first installer process may execute on a first processor of the client computer system to install a first portion to be installed of the software application. A second installer process may also execute on the first processor to install a second portion to be installed of the software application. Thus, the first installer process and the second installer process may execute concurrently on the first processor. Alternatively, the second installer process may execute on a second processor of the client computer system (e.g., if the computer is a multi-processor computer system) simultaneously with the first installer process executing on the first processor of the client computer system. Alternatively, each portion of the software application may be installed sequentially, either each by a respective installer process, or all by a single installer process, as desired.

Certain embodiments may further include one or more downloader processes executing concurrently or simultaneously with one or more installer processes. For example, the first downloader process downloading the first portion to be downloaded may execute concurrently or simultaneously (either on the same processor or on a different processor) in the client computer system with the first installer process installing the first portion to be installed (e.g., which may have previously been downloaded to the client computer system). In other embodiments, multiple downloader processes may execute concurrently or simultaneously with an installer process, multiple installer processes may execute concurrently or simultaneously with a downloader process, or multiple downloader processes may execute concurrently or simultaneously with multiple installer processes, in this manner, as desired.

It should be noted that in some embodiments, a downloader process which has completed downloading a portion of the software application may continue as an installer process to install that portion of the software application on the client computer system. Alternatively, once a downloader process has completed downloading a portion of the software application, a different installer process may install that portion of the software application on the client computer system (either immediately or at a later time, as desired). In other embodiments, after a downloader process has completed downloading a portion of the software application, it may simply remain on the computer until further action is taken (e.g., by a user).

Another set of embodiments may include a computer-readable memory medium comprising program instructions executable to perform the method described above in various embodiments.

An additional set of embodiments may include a computer system, including a processor, or in some embodiments, a plurality of processors, and a memory medium comprising program instructions executable to perform the method described above, in various embodiments.

Another set of embodiments may include a computer accessible memory medium including program instructions for a server computer to provide a software application to a client computer system. The software application may include a plurality of portions. The program instructions may be executable to determine which of the plurality of portions of the software application are currently present on the client computer system, and which of the plurality of portions of the software application are not currently present on the client computer system. The program instructions may be further executable to provide to the client computer system (e.g., to upload to the client computer system) each of the portions which are not currently present on the client computer system. In some embodiments, the program instructions may be executable to provide to the client computer system only those portions not currently present on the client computer system, in other words, the portions which are already present on the client computer system may not be provided to the client computer system by the server computer.

A further set of embodiments may include a method for a server computer to provide a software application to a client computer system, including determining which of a plurality of portions of the software application are and are not present on the client computer system, and providing to the client computer system those portions which are not present on the client computer system, as described above.

An additional set of embodiments may include a server computer, including a processor and a memory medium, where the memory medium includes program instructions for the server computer to provide a software application to a client computer system, as described above.

BRIEF DESCRIPTION OF THE DRAWING

A better understanding of the present invention can be obtained when the following detailed description of the preferred embodiment is considered in conjunction with the following drawings, in which:

FIG. 5 is an exemplary screenshot of two installer packages according to one prior art system;

Figure 1A:
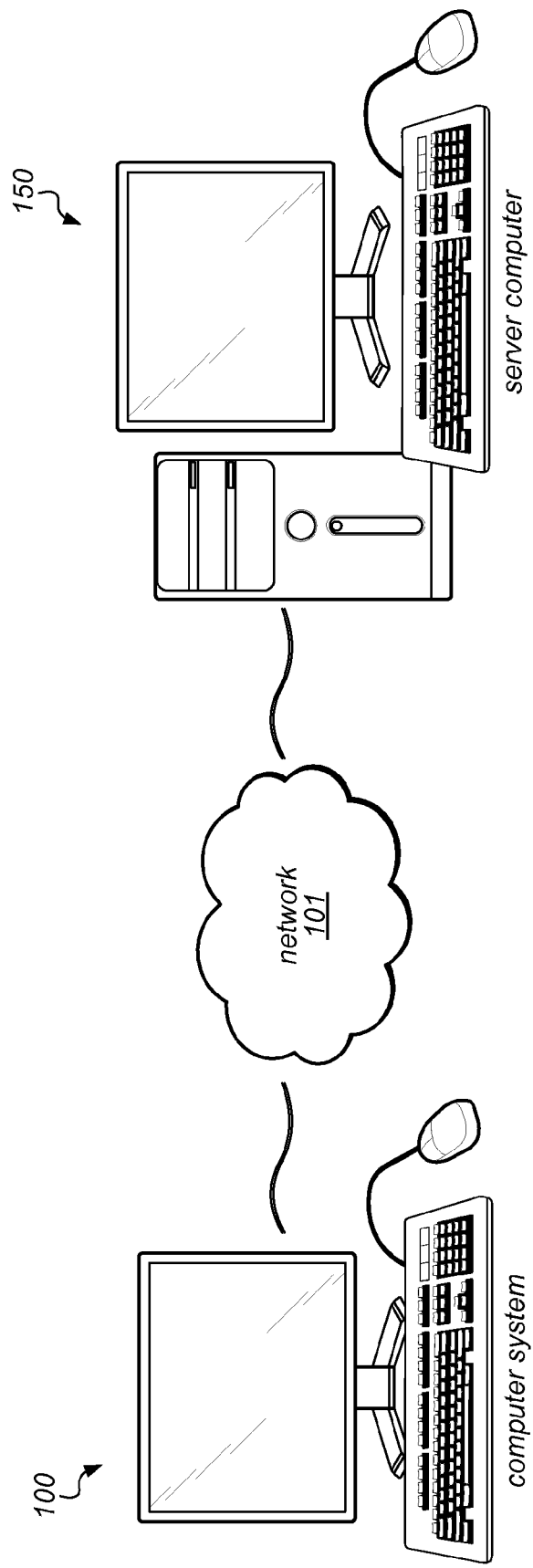
FIGS. 1A and 1B illustrate a computer system connected to a server computer over a network according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Figure 1B:
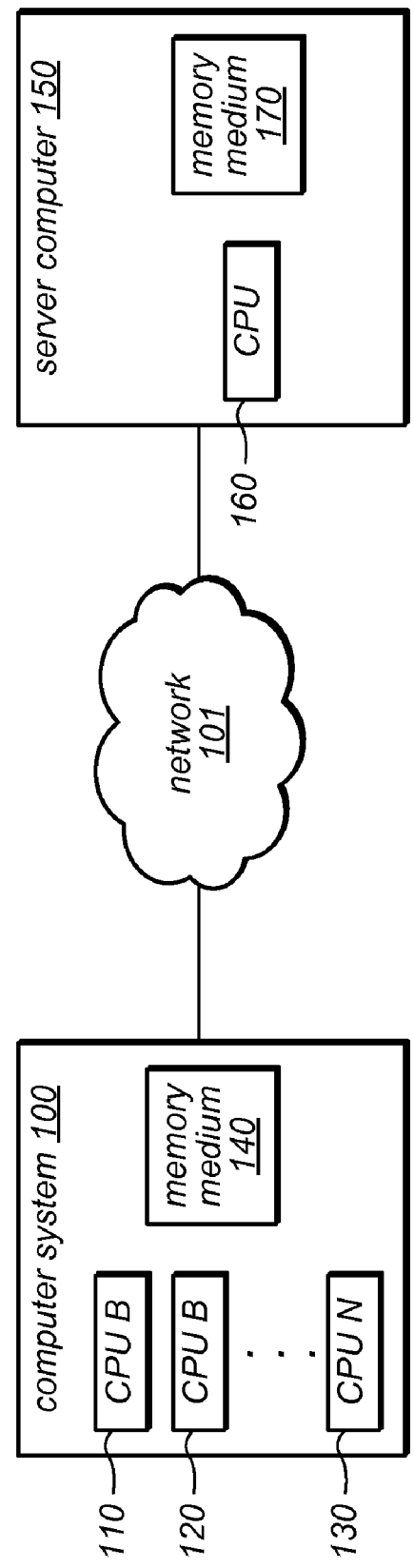

FIGS. 1A and 1B—Computer System Connected to a Server Computer over a Network

FIGS. 1A and 1B illustrate an exemplary computer system connected to a server computer over a network according to one embodiment. The computer system 100 may include at least one processor 110, and at least one memory medium 140. The computer system 100 may include a plurality of processors (e.g., CPU A 110, CPU B 120, . . . , CPU N 130), i.e., may be a multi-processor system. The multi-processor system may include multiple processor cores embedded on a single chip, or multiple discrete processors, or some combination thereof. The processors may share one or more resources of the computer system, such as memory medium 140, any hardware devices, network adapters, and so on: in general the processors of the multi-processor system may work cooperatively to accomplish various computing tasks in the multi-processor system. In another embodiment, the computer system 100 may only include one processor, e.g., may be a single processor system.

The computer system 100 may be connected to the server computer 150, e.g., over network 101. The network 101 may be any of various types of networks, such as a local area network (LAN) or a wide area network (WAN), such as the internet The computer system 100 may include functionality (e.g., hardware and/or software) for communicating over the network 101, for example may be able to browse and download content on the internet, e.g. on the world-wide web. The computer system may also be connected to more than one network; alternatively, in some embodiments the computer may not be connected to a network.

The server computer 150 may include a processor 160 and a memory medium 170. The server computer may include or have access to one or more software applications, which may be available for download over a network, such as network 101.

The computer system 100 may include one or more software applications. Generally speaking, a software application may be a set of program instructions executable by one or more processors to perform a function. A software application may be stored on a memory medium of a computer system. In some cases a software application may need to be installed in the memory of the computer system before the software application becomes fully functional on that computer system. In such cases the software application may be installed to the computer system memory from a storage medium such as a CD-ROM, a floppy disk, a USB flash drive, or some other medium which may be temporarily or permanently coupled to the computer system. Alternatively, the software application (e.g., an installation package executable to install the software application) may be downloaded, e.g. a software application might be downloaded from the server computer 150, over the network 101, to the computer system 100, and then installed. Installation of a software application may be executed on a computer system by an installer, which may itself be a software application, e.g. a software application that may be used to install, repair, and/or remove other software applications on a computer system.

The computer system 100 may additionally contain or be coupled to other components or resources, such as a display device, a printer, a keyboard and/or mouse, one or more measurement devices, an expansion bus, and/or other resources, as desired. The server computer 150 may similarly contain or be coupled to any number and/or type of additional components or resources. However, elements of a computer not necessary to understand the present description have been omitted for simplicity.

Figure 2:
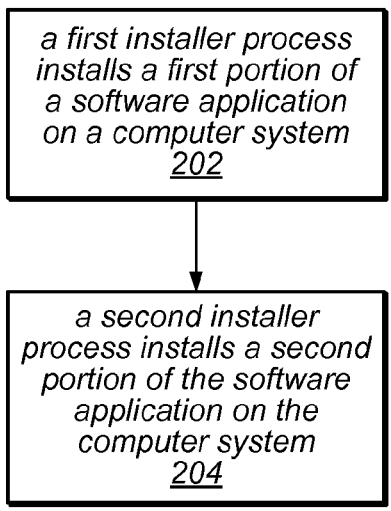
FIG. 2 is a flowchart diagram illustrating a method for installing a software application on a computer system according to one embodiment.

FIG. 2—Method for Installing a Software Application in a Computer System

FIG. 2 is a flowchart diagram illustrating a method for installing a software application in a computer system according to one embodiment. The steps shown in FIG. 2 and described below may be performed by a computer system such as those illustrated in FIGS. 1A and 1B or various alternate embodiments thereof.

In 202, a first installer process installs a first portion of a software application on a computer system. The first installer process may execute on a first processor of the computer system. The computer system may be a single-processor computer system, or alternatively, may be a multi-processor computer system. The first installer process may execute on the first processor as a single thread. Alternatively, the first installer process may execute on the first processor in a multi-threaded fashion. In one embodiment, the first portion may comprise multiple sub-portions of the software application, and the first installer process may execute each sub-portion as a different thread running on a different processor of a first plurality of processors of a multi-processor system. In some embodiments, the computer system may be a client computer system. Installing the first portion of the software application may include installing the first portion onto a memory medium of the computer system.

In 204, a second installer process installs a second portion of the software application on the computer system. The second installer process may execute on the first processor, if the computer system is a single processor computer system. Alternatively the second installer process may execute on a second processor, in a multi-processor computer system. The second installer process may execute on the second processor as a single thread. Alternatively, the second installer process may execute on the second processor in a multi-threaded fashion. In one embodiment, the second portion may comprise multiple sub-portions of the second portion of the software application, and the second installer process may execute each sub-portion of the second portion as a different thread running on a different processor of a second plurality of processors of a multi-processor system. Installing the second portion of the software application may include installing the second portion onto a memory medium of the computer system.

The first installer process and the second installer process may execute concurrently or simultaneously on the first processor or on their respective processors. In other words, if the system is a single processor computer system, the thread(s) of the first installer process may execute concurrently with the thread(s) of the second installer process on the first processor, i.e., may execute in an interleaved fashion on the single processor. Or, in a multi-processor computer system, the thread(s) of the first installer process may execute on the first processor (or first plurality of processors) simultaneously with the thread(s) of the second installer process executing on the second processor (or second plurality of processors). Here the terms "concurrently" and "simultaneously" have their ordinary accepted meanings, and include situations where, for example, there is at least a partial overlap in time in execution of the first installer process and the second installer process.

In some embodiments, (e.g., if there is a third portion of the software application) there may be a third installer process which installs a third portion of the application in the memory of the computer system. The third installer process may execute (concurrently with the first installer process and/or second installer process) on the first processor (e.g., in a single processor computer system), or on the second processor (e.g. in a multi-processor computer system), or on a third processor (e.g., in a multi-processor computer system). In various embodiments there may be more installer processes, e.g., a fourth, a fifth, etc, as desired, for example if there were more processors in the multi-processor computer system. However, in some embodiments, the software application may only include the first portion and the second portion, such that after the first installer process has completed installing the first portion of the application and the second installer process has completed installing the second portion of the application, the application may be fully installed.

A memory medium may store program instructions executable to perform the foregoing method. For example, the memory medium may include first program instructions executable as the first installer process on a first processor and second program instructions executable as the second installer process, either also on the first processor or on a second processor, as desired.

According to another embodiment, there may be a computer system configured to perform the foregoing method. For example, a computer system may include a first processor and a memory medium. The memory medium may include first program instructions executable as the first installer process on the first processor and second program instructions executable as the second installer process on the first processor. Alternatively, the computer system may include a first processor, a second processor, and a memory medium. In this case the memory medium may include first program instructions executable as the first installer process on the first processor and second program instructions executable as the second installer process on the second processor, where the first installer process and the second installer process execute concurrently.

Thus, by allowing a software application installer to install a software application as a plurality of portions, each executable as a separate process, and executing the processes concurrently or simultaneously in a single- or a multi-processor computer system, the resources of the computer system may be used more efficiently for installing software, potentially resulting in a significant reduction in the installation time of a software application.

It should be noted that in some embodiments, the method of FIG. 2 as described above may also or alternatively apply to installing multiple software applications, concurrently or simultaneously, on a computer system. The method should not be considered to be limited to installing multiple portions of a single software application.

Figure 3:
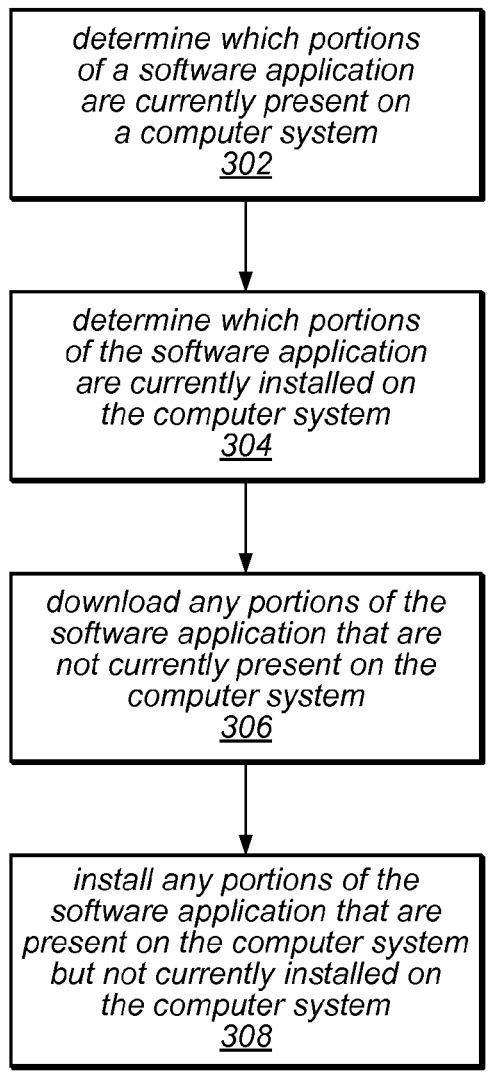
FIG. 3 is a flowchart diagram illustrating a method for downloading and installing a software application on a computer system according to one embodiment.

FIG. 3—Method for Downloading and Installing a Software Application on a Computer System.

FIG. 3 is a flowchart diagram illustrating a method for downloading a software application on a computer system according to one embodiment. In some embodiments the method may further include method steps for installing the downloaded software application on the computer system. The steps shown in FIG. 3 and described below may be performed by a computer system such as those illustrated in FIGS. 1A and 1B or various alternate embodiments thereof.

In some embodiments the software application may include a number of portions (e.g., a plurality of portions). For example, the software application may have different portions with different functionality; in one example, a user might already have installed one (or several) portions of the software application, but may desire to add another portion (or several portions) to expand the functionality of the software application. Thus in this example, the method might be used to detect (or determine) which portions are already present and/or installed on the computer system. In another embodiment, a first software application may include a portion that is also included as part of a second software application. Thus, if the second software application is already installed on the computer system, the common portion may not need to be downloaded and installed with the remaining portions of the first software application. In another embodiment, the software application may be comprised as a plurality of portions specifically for the purpose of allowing discrete processes to download and install of each portion. An additional possibility could include a network failure occurring during the process of downloading portions of a software application. In this case, some portions may have completed downloading while others may have been interrupted, so some portions may be present on the computer system while other portions may not be present. Thus, determining which (if any) portions of the software application are already present and/or installed on the computer system prior to downloading and installing the software application may reduce the number of portions that need to be downloaded and/or installed.

In 302, which portions of a first software application are currently present on the computer system may be determined. In one embodiment, a second software application, e.g., a downloader application, may perform this step. For example, the downloader application may programmatically detect which portions of the first software application are currently present on the computer system. In various embodiments, it may be determined that one or more of the portions of the first software application are currently present on the computer system while one or more other of the portions of the first software application are not currently present on the computer system. Alternatively, all, or none, of the portions of the first software application may be currently present on the computer system.

In 304, which portions of the first software application are currently installed on the computer system may be determined. As with step 302, this step may be performed programmatically by another (e.g., a third) software application. The third software application may also be the second software application. For example, the downloader application of step 302 may also programmatically detect which portions of the first software application (e.g., of the portions currently present on the computer system) are currently installed on the computer system. However, in some embodiments, the third software application may instead be a separate software application from the second software application, e.g. may be a discrete installer application.

In some embodiment, it may be determined that one or more portions of the first software application are currently installed on the computer system and that one or more portions of the software application are currently present on the computer system but not installed on the computer system. Alternatively, it may be determined that all, or none, of the portions currently present on the computer system are also currently installed on the computer system.

In 306, any portions of the first software application that are not currently present on the computer system may be downloaded. As noted above, a downloader application may have determined which (if any) portions of the software application are not currently present on the computer system. The downloader application may then download the portions determined to not currently be present on the computer system.

In some embodiments, e.g., if there are multiple (e.g., a plurality) of portions to be downloaded, the downloader application may download two (or more) portions concurrently or simultaneously. For example, the downloader application may execute as two (or more) downloader processes, each of which may download a respective portion of the plurality of portions to be downloaded. In one embodiment, some, or all, of the downloader processes may execute concurrently, in a multi-threaded fashion, e.g., on a single processor. In another embodiment, some, or all, of the downloader processes may execute simultaneously, e.g., each on a processor of a multi-processor system. Alternatively, in some embodiments, only one downloader process may download a portion of the software application at a time.

In 308, any portions of the first software application that are present on the computer system but not currently installed on the computer system may be installed. In some embodiments, the installing may be performed by the same application (e.g., the downloader application) that may have performed the previous steps. Thus, the downloader application may be a downloader and an installer application. In other embodiments, the installing may be performed by a separate application, e.g., a discrete installer application (such as noted above with respect to step 304). The installer application may have determined which portions are currently present but not installed on the computer system. The installer application may then install the determined portions of the first software application.

In some embodiments, e.g., if there are multiple (e.g., a plurality of) portions to be installed, the installer application may install two (or more) portions concurrently or simultaneously. For example, the installer application may execute as two (or more) installer processes, each of which may install a respective portion of the plurality of portions to be installed. In one embodiment, some, or all, of the installer processes may execute concurrently, in a multi-threaded fashion, e.g., on a single processor. In another embodiment, some, or all, of the installer processes may execute simultaneously, e.g., each on a processor of a multi-processor system. In various embodiments, this step may be implemented with the method of FIG. 2, e.g., in any of the various ways described above with respect to FIG. 2.

In some embodiments, it may be possible to perform some or all of the steps described above simultaneously or concurrently; it may be possible to omit and/or repeat some or all of the steps in various embodiments; it may additionally be possible to perform the steps of the method in a different order than shown.

For example, in one embodiment, it may be possible to simultaneously determine which portions are or are not present on the computer system and which portions are present but not installed on the computer system (e.g., perform steps 302 and 304 simultaneously). Alternatively, it may be possible to determine which portions are or are not present on the computer system, then download those portions which are not present on the computer system, then determine which portions are present but not installed (e.g., perform step 302, then 306, then 304).

In still another embodiment, it may be possible to download one or more portions simultaneously with installing one or more (e.g., other) portions (e.g. perform steps 306 and 308 simultaneously). For example, in steps 302 and 304, it may be determined that a first portion is not currently present on the computer system and a second portion is currently present but not installed on the computer system. The first portion may then be downloaded by a downloader process executing on a first processor of the computer system. The second portion may concurrently or simultaneously be installed by an installer process also executing on the first processor. Alternatively, the second portion may concurrently or simultaneously be installed by an installer process executing on a second processor of the computer system (e.g., in a multi-processor computer system). In various embodiments, it may be possible to download and/or install any number of portions of a software application concurrently or simultaneously, in this way. For example, in some embodiments it may be advantageous to execute at least as many installer and/or downloader processes as there are processors in the system; in this way, the full processing power of the computer system may be optimally utilized. On the other hand, there may also be factors which limit the advantage gained by executing additional processes, such as the write speed access to disk. Thus, there may be an optimal number of processes to simultaneously execute in any given system.

In some embodiments, a downloader process which is downloading a portion of the first software application may, upon finishing the download of the given portion, may continue as an installer process and begin installing the downloaded portion. In other embodiments, upon completion of the download of the given portion, a different process (e.g., a new installer process) may automatically (either immediately or at a later time, as desired) begin installing the given portion onto the computer system. Alternatively, after the downloader process completes downloading the given portion, it may simply remain on the computer until further action is taken (such as a user initiating an installation process, e.g., at a later time).

Thus, the method may provide a way to determine which portions of a software application are and are not present on a computer system, potentially allowing the computer system to download only those portions needed to complete the software application, thereby saving processing power and downloading time, and avoiding unnecessary network traffic. Additionally, in some embodiments the method may further allow for a faster overall installation process, by enabling simultaneous execution of multiple downloader processes, multiple installer processes, or even multiple downloader and installer processes, thereby optimally using the processing power of the computer system, especially in the cases where the computer system is a multi-processor computer system.

In some embodiments, one or more of the method elements shown in FIG. 3 and described above may also or alternatively apply to downloading and/or installing multiple software applications, concurrently or simultaneously, on a computer system. The method should not be considered to be limited to downloading and/or installing multiple portions of a single software application.

In an alternate set of embodiments, steps similar to 302 and 306 may be performed by the server computer instead of by the client computer system. Thus in these embodiments, the server computer may detect which portions of the software application are currently present on the client computer system and which portions of the software application are not currently present on the client computer system. The server computer may then itself initiate the process of providing the portions not present on the client computer system to the client computer system; for example, the server computer may upload those portions to the client computer system. The server computer may for example include a processor, and a memory medium, where the memory medium includes program instructions executable by the processor to perform these steps.

Figure 4:
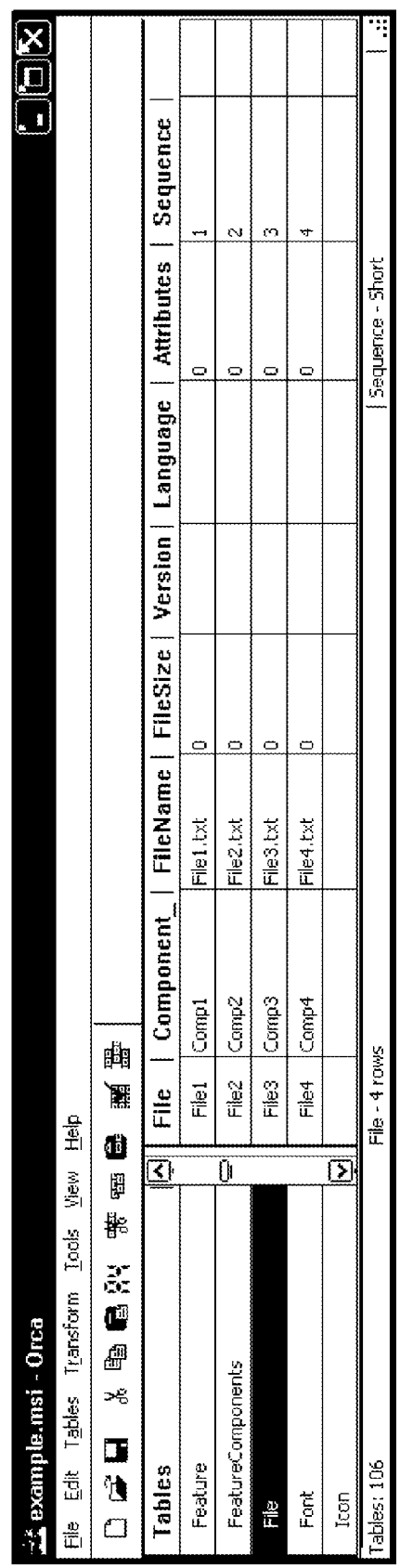
FIG. 4 is an exemplary screenshot of an installer package according to one prior art system.
Figures 5A, 5B:
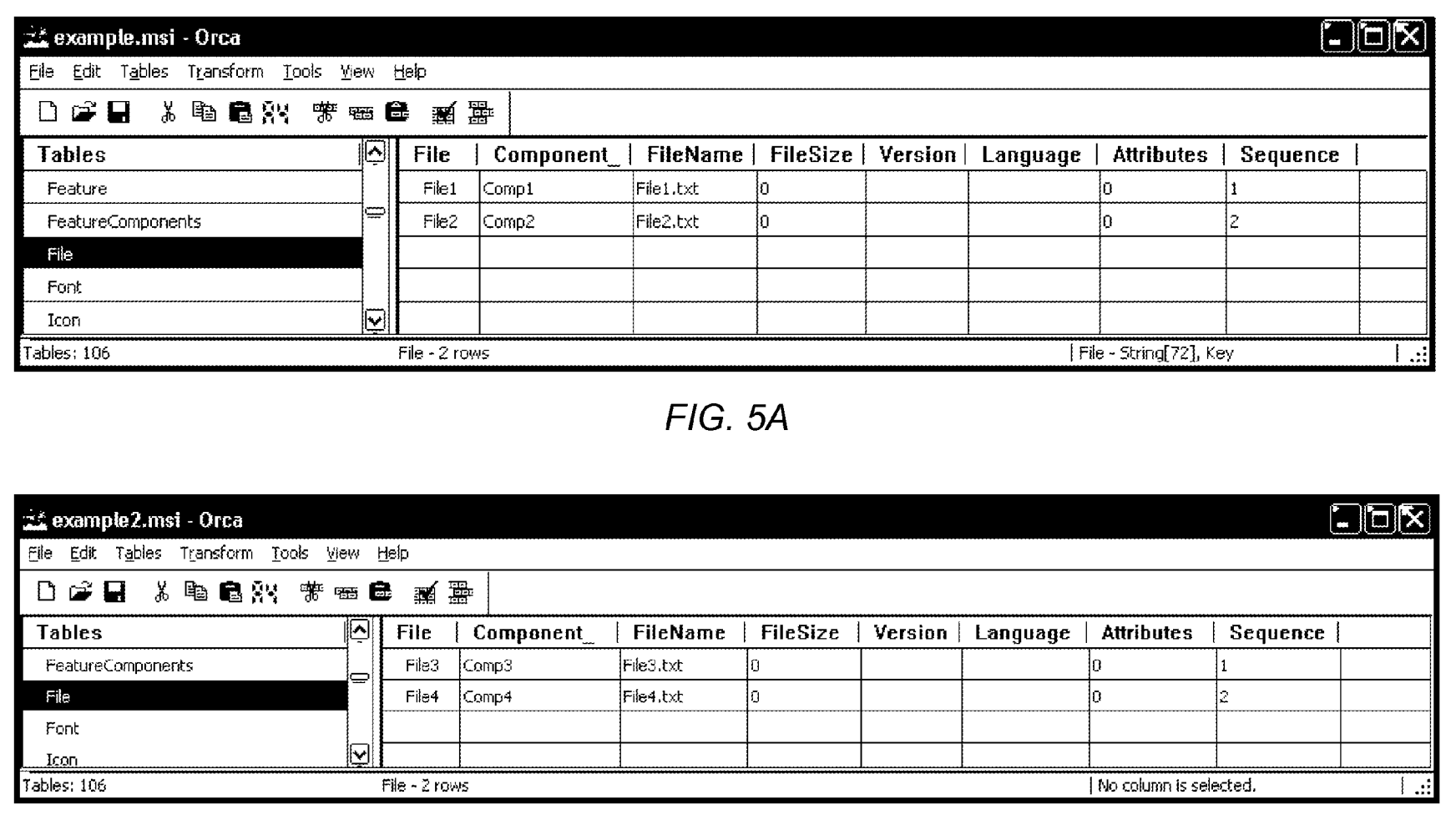
Figure 6:
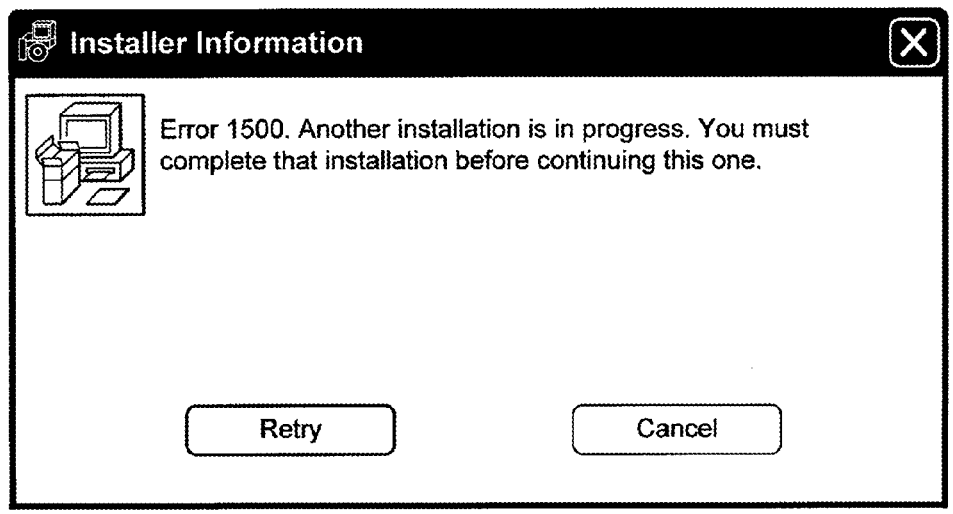
FIG. 6 is an exemplary screenshot of an error message displayed when an attempt is made to run two installer packages at the same time according to one prior art system.

FIGS. 4-6—Exemplary Screenshots of Prior Art Installer Packages

FIG. 4 illustrates an exemplary screenshot of an installer package according to one prior art system. FIG. 5 illustrates an exemplary screenshot of two installer packages according to the same prior art system. FIG. 6 illustrates an exemplary screenshot of an error message displayed when an attempt is made to execute the two installer packages at the same time according to the prior art system.

Installer packages mainly comprise files-prior art technologies require each file to be sequentially executed, e.g., in the order shown in the 'Sequence' column, or in a different order, depending on the prior art system. Such prior art technologies provide no means for installing files in parallel (i.e., concurrently or simultaneously) within a single installer package.

While it is possible to divide an installer package (e.g., the installer package shown in FIG. 4) into multiple packages (e.g., as shown in FIG. 5), prior art systems do not allow the multiple packages to be executed in parallel on a computer system. If this were attempted, an error message (e.g., such as the error message shown in FIG. 6) might be displayed, and still only one installer package could execute at a time.

Figure 7:
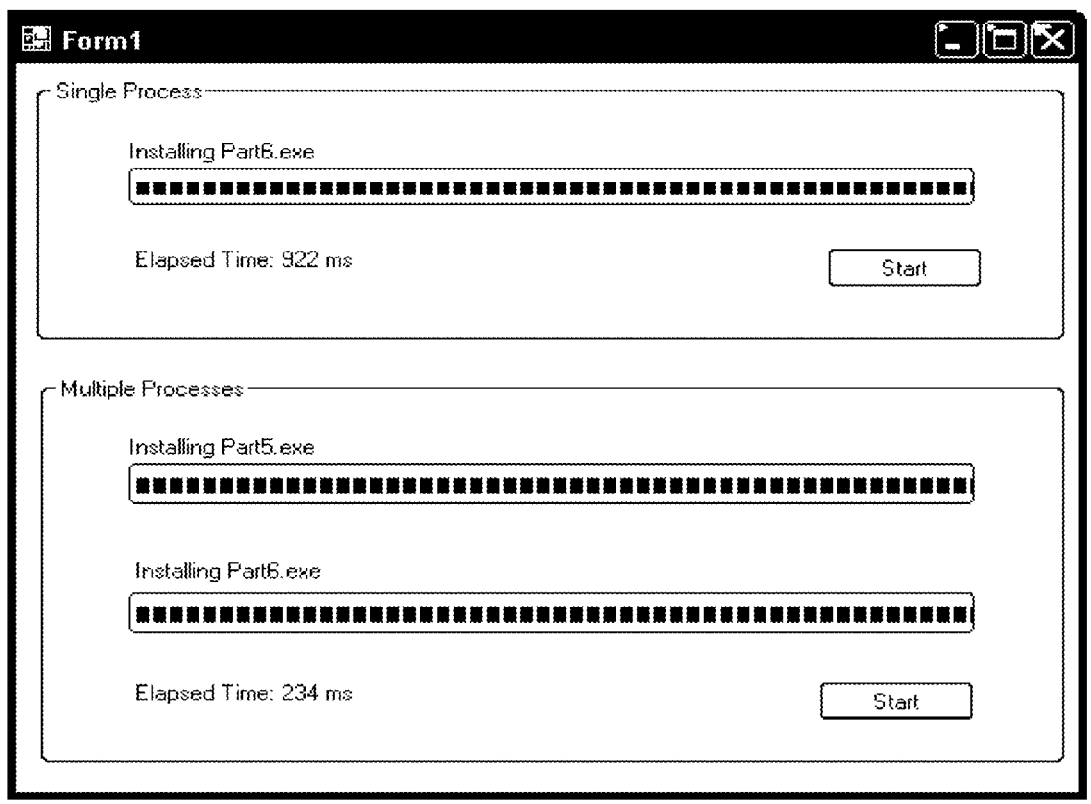
FIG. 7 is an exemplary screenshot of a comparison between a one-process installation and a two-process installation of a test application.

FIG. 7—Exemplary Screenshot of a Comparison between a One-Process Installation and a Two-Process Installation FIG. 7 illustrates an exemplary screenshot of a comparison between a one-process installation and a two-process installation of a test application according to one embodiment. As shown, when the test application is installed by two installer processes executing in parallel (e.g., concurrently or simultaneously), the installation time may be significantly reduced from the installation time taken by a single installer process.

Figure 8:
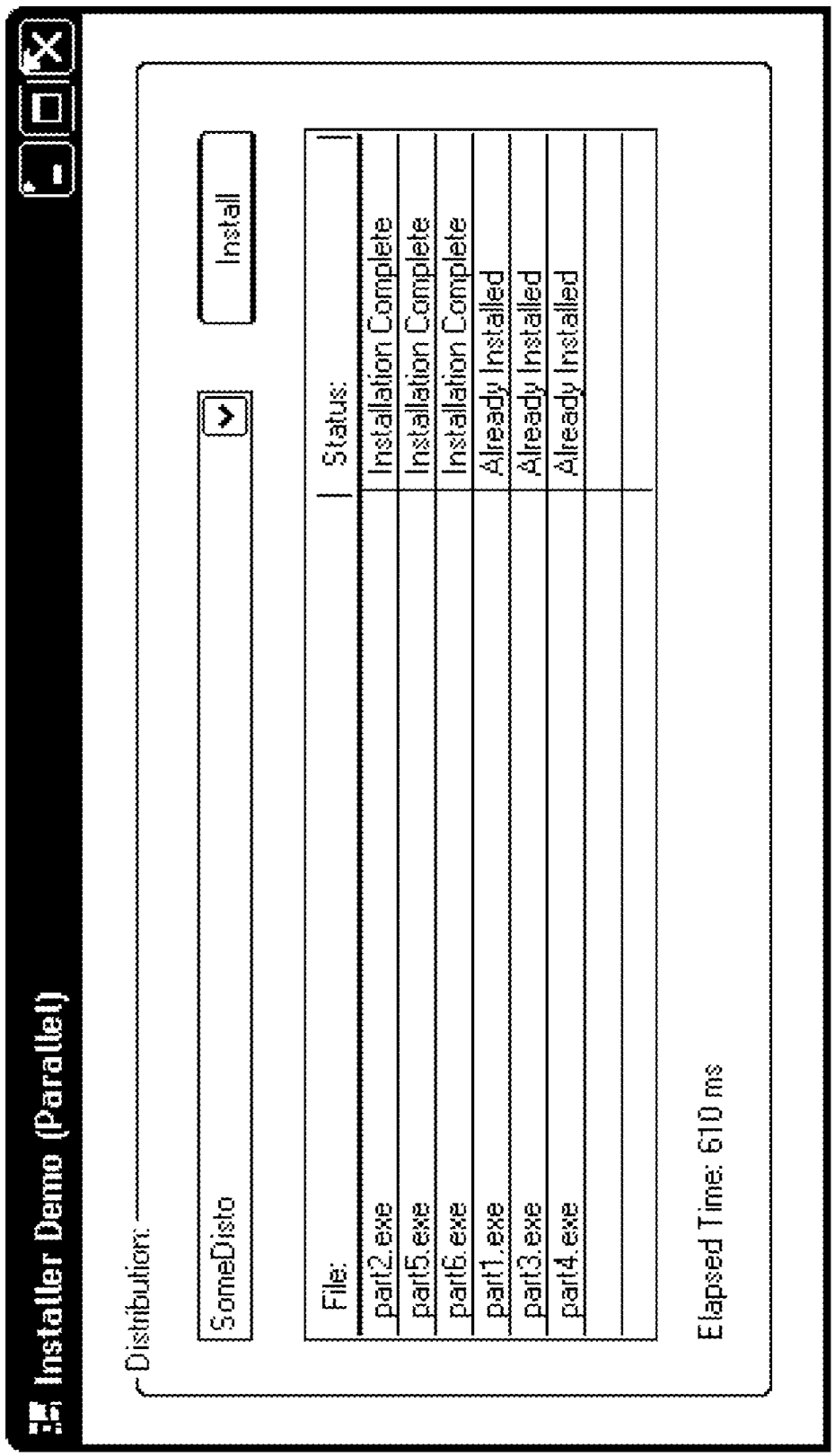
FIG. 8 is an exemplary screenshot of a framework for detecting, downloading, and installing multiple portions of an installer package simultaneously.

FIG. 8—Exemplary Screenshot of a Framework for Detecting, Downloading and Installing Multiple Portions of an Installer Package FIG. 8 illustrates an exemplary screenshot of a framework for detecting, downloading, and installing multiple portions of an installer package according to one embodiment. In the example shown, the software application is divided into six portions (i.e., part1.exe through part6.exe). The framework detected that part1.exe, part3.exe, and part4.exe were present and installed on the computer system, while part2.exe, part5.exe, and part6.exe were not, and downloaded and installed the portions that were not present on the computer system, executing each download/install as a separate process, according to an embodiment of the system and method described herein.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-implemented method for downloading and installing a software application from a server computer to a client computer system, wherein the software application comprises a plurality of portions, the method comprising:
    determining that a first portion of the software application is present and not installed on the client computer system;
    determining that a second portion of the software application is not present on the client computer system;
    installing the first portion of the software application onto the client computer system;
    downloading, from the server computer, the second portion of the software application onto the client computer system, wherein said downloading is based on determining that the second portion of the software application is not present on the client computer system;
    wherein installing the first portion and downloading the second portion are performed concurrently by the client computer system.

2. The computer-implemented method of claim 1, wherein the first portion of the software application is not downloaded from the server computer onto the client computer system based on determining that the first portion of the software application is present on the client computer system.

3. The computer-implemented method of claim 1, the method further comprising:
    determining that a third portion of the software application is present and installed on the client computer system;
    wherein the third portion of the software application is not downloaded from the server computer onto the client computer system based on determining that the third portion of the software application is present on the client computer system.

4. The computer-implemented method of claim 1,
    wherein installing the first portion comprises an installer process executing on a processor of the client computer system;
    wherein downloading the second portion comprises a downloader process executing on the processor of the client computer system;
    wherein the installer process and the downloader process execute concurrently on the processor in a multi-threaded fashion.

5. The computer-implemented method of claim 1, wherein the client computer system is a multi-processor client computer system,
    wherein installing the first portion comprises an installer process executing on a first processor of the multi-processor client computer system;
    wherein downloading the second portion comprises a downloader process executing on a second processor of the multi-processor client computer system;
    wherein the installer process and the downloader process execute simultaneously.

6. The computer-implemented method of claim 1, the method further comprising:
    downloading, from the server computer, a third portion of the software application onto the client computer system;
    wherein installing the first portion and downloading the second and third portions are performed concurrently by the client computer system.

7. The computer-implemented method of claim 1, the method further comprising:
    downloading and installing an additional one or more portions of the software application;
    wherein the first portion, the second portion, and the additional one or more portions comprise the entire software application.

8. A non-transitory computer-accessible memory medium comprising program instructions for downloading and installing a software application from a server computer to a client computer system, wherein the software application comprises a plurality of portions, wherein the program instructions are executable to:
    determine that a first portion of the software application is present and not installed on the client computer system;
    determine that a second portion of the software application is not present on the client computer system;
    install the first portion of the software application onto the client computer system;
    download, from the server computer, the second portion of the software application onto the client computer system, wherein said downloading is based on determining that the second portion of the software application is not present on the client computer system;
    wherein the program instructions are executable by the client computer system to install the first portion and download the second portion concurrently.

9. The non-transitory computer-accessible memory medium of claim 8, wherein the program instructions are further executable to:
    determine that a third portion of the software application is present and installed on the client computer system.

10. The non-transitory computer-accessible memory medium of claim 8,
    wherein the program instructions for installing the first portion of the software application and downloading the second portion of the software application are concurrently executable as discrete processes by a processor of the client computer system in a multi-threaded fashion.

11. The non-transitory computer-accessible memory medium of claim 8,
    wherein the program instructions for installing the first portion of the software application and downloading the second portion of the software application are simultaneously executable as discrete processes by first and second processors of the client computer system.

12. The non-transitory computer-accessible memory medium of claim 8, wherein the program instructions are further executable to:
    download, from the server computer, a third portion of the software application onto the client computer system;
    wherein the program instructions are executable by the client computer system to install the first portion and download the second and third portions concurrently.

13. The non-transitory computer-accessible memory medium of claim 8, wherein the program instructions are further executable to:
    download and install an additional one or more portions of the software application;
    wherein the first portion, the second portion, and the additional one or more portions comprise the entire software application.

14. A client computer system, comprising:
    a first processor;
    a memory medium comprising program instructions for downloading and installing a software application from a server computer to a client computer system, wherein the software application comprises a plurality of portions, wherein the program instructions are executable to:
        determine that a first portion of the software application is present and not installed on the client computer system;
        determine that a second portion of the software application is not present on the client computer system;
        install the first portion of the software application onto the client computer system;
        download, from the server computer, the second portion of the software application onto the client computer system;
        wherein the program instructions are executable by the client computer system to install the first portion and download the second portion concurrently.

15. The client computer system of claim 14,
    wherein the program instructions for installing the first portion of the software application and downloading the second portion of the software application are concurrently executable as discrete processes by the first processor of the client computer system in a multi-threaded fashion.

16. The client computer system of claim 14, wherein the client computer system further comprises:
    a second processor;
    wherein the program instructions for installing the first portion of the software application and downloading the second portion of the software application are simultaneously executable as discrete processes by the first and second processors.

17. A computer-implemented method for downloading and installing a software application from a server computer to a client computer system, wherein the software application comprises a plurality of portions, the method comprising:
    installing a first portion of the software application onto the client computer system;
    downloading, from the server computer, a second portion of the software application onto the client computer system;
    wherein installing the first portion and downloading the second portion are performed concurrently by the client computer system.

18. The computer-implemented method of claim 17, the method further comprising:
    downloading, from the server computer, the first portion of the software application onto the client computer system, wherein downloading the first portion of the software application is performed prior to installing the first portion of the software application onto the client computer system.

19. A non-transitory computer-accessible memory medium comprising program instructions for downloading and installing a software application from a server computer to a client computer system, wherein the software application comprises a plurality of portions, wherein the program instructions are executable to:
    install a first portion of the software application onto the client computer system;
    download, from the server computer, a second portion of the software application onto the client computer system;
    wherein the program instructions are executable by the client computer system to install the first portion and download the second portion concurrently.

20. The non-transitory computer-accessible memory medium of claim 19, wherein the program instructions are further executable to:
download, from the server computer, the first portion of the software application onto the client computer system, wherein the program instructions are executable by the client computer system to download the first portion of the software application prior to installing the first portion of the software application onto the client computer system.

* * * * *